US007283301B2

(12) United States Patent
Peeters et al.

(10) Patent No.: US 7,283,301 B2
(45) Date of Patent: Oct. 16, 2007

(54) EMISSIVE SCREEN DISPLAY WITH LASER-BASED EXTERNAL ADDRESSING

(75) Inventors: Eric Peeters, Fremont, CA (US); Noble M. Johnson, Menlo Park, CA (US); Ross D. Bringans, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 334 days.

(21) Appl. No.: 11/016,242

(22) Filed: Dec. 17, 2004

(65) Prior Publication Data

US 2006/0132472 A1 Jun. 22, 2006

(51) Int. Cl.
*G03B 21/56* (2006.01)

(52) U.S. Cl. ...................................................... 359/443

(58) Field of Classification Search ................ 359/443, 359/449, 453, 460, 202, 207; 353/77, 79
See application file for complete search history.

(56) References Cited

U.S. PATENT DOCUMENTS 6,594,090 B2 7/2003 Kruschwitz et al.
6,607,287 B1 8/2003 Ayala, Jr. et al.
6,832,724 B2 * 12/2004 Yavid et al. ................ 235/454
2003/0222849 A1 12/2003 Starkweather

* cited by examiner

*Primary Examiner*—W. B. Perkey
*Assistant Examiner*—Robert Do
(74) *Attorney, Agent, or Firm*—Bever, Hoffman & Harms, LLP; Patrick T. Bever

(57) ABSTRACT

A display apparatus includes an emissive screen having luminescent pixels that are addressed solely by a laser addressing system. Each pixel includes a luminescent region located next to a photocathode. When struck by the laser beam, free electrons are created that are accelerated by an applied high voltage field from the photocathode to the luminescent region, thereby causing the luminescent region to emit visible light with a brightness (energy) that is substantially higher than the energy of the addressing beam. Apertures are optionally provided in hexagonal luminescent regions to relax beam-scanning requirements. Optional millichannel plates (crude versions of $2^{nd}$ generation night vision system Microchannel plates) are provided to enhance photon multiplication. A position sensitive device is implemented using the photocathode or photoanode (luminescent) material to facilitate the scanning and modulating process. Ambient light is prevented from generating unwanted pixel activation by filter coatings, spatial filtering or electronic filtering.

27 Claims, 8 Drawing Sheets

EMISSIVE SCREEN DISPLAY WITH LASER-BASED EXTERNAL ADDRESSING

FIELD OF THE INVENTION

The present invention relates to display devices, and more particularly to laser-based display devices.

BACKGROUND OF THE INVENTION

Conventional displays are currently produced in several technology types, including cathode-ray tube (CRT), light emitting diode (LED), liquid crystal displays (LCDs), and projection display systems. CRT displays utilize a vacuum tube and an electron beam source mounted behind a luminescent screen to generate an image. LED displays include an array of light emitting pixels that are individually addressed by an active or passive backplane (addressing circuitry) to generate an image. Projection display systems utilize a projection device that projects an image onto a passive, typically white screen, which is reflected back toward an audience.

Large area display applications (e.g., greater an 60") are most commonly implemented using projection display technology due to their lower cost and power consumption. CRT and LED displays are typically cost effective to product and operate when relatively small in size, but are typically too heavy and/or require too much power to operate when produced in a large area display format. In contrast, projection display systems are more easily scalable to larger area formats simply by increasing the size of the relatively low-cost, light weight screen, and increasing the size of the image projected on the screen.

Projection displays include arc lamp displays and laser-based projection displays. Early projection display systems used a white light source, such as a xenon arc or halogen lamp, that illuminates one or more light valves or spatial light modulators with appropriate color filtering to form the projected image, thus facilitating the production of relatively inexpensive, scalable, low-power, large area displays. However, such arc lamp projection displays are often criticized because of poor picture sharpness, a small viewing angle, and because the projected picture is readily "washed out" by bright ambient light. More recently, laser-based projection displays have been introduced that operate in a manner similar to arc lamp projection displays, but avoid the picture quality issues by utilizing relatively bright red, green and blue laser beams to generate much higher quality projected images. A fundamental problem with large-area laser-based displays, however, is the laser power that is required to generate a suitable picture. The power required (e.g. >1 W) is well beyond that which is considered safe in consumer applications. In addition, inexpensive lasers with sufficient power are not yet available, especially at the green and blue wavelengths, thus making laser-based displays significantly more expensive than arc lamp displays. Moreover, even high-powered displays become washed out in high ambient light due to their use of white screens (which are used to limit the required laser brightness). Dark or black screens may be used to prevent this wash-out problem, but this only increases the power requirements on the lasers, making the overall display system impractically expensive.

What is needed is a scalable, large area display apparatus that provides a picture equal to or greater than state of the art laser-based projection displays, but is less expensive to produce and operate, and avoids the safety concerns associated with the use of high powered lasers.

SUMMARY OF THE INVENTION

The present invention utilizes an emissive (visible light-emitting) screen and a laser addressing system to provide a scalable low-cost display apparatus that solves both the safety and brightness issues associated with conventional laser-based projection displays. The emissive screen includes an array of red, green, and blue pixels that are addressed solely by the laser addressing system (i.e., no active or passive addressing backplane is provided on the emissive screen). Similar to the light amplification techniques utilized in image enhancement (e.g., night vision) systems, each pixel of the emissive screen includes a photon-multiplication device formed by a luminescent pad located near a photocathode. When the laser addressing system transmits the laser beam onto the photocathode of a selected pixel, free electrons are created that are accelerated by an applied electric field from the photocathode to the luminescent pad, thereby causing the luminescent pad to emit visible light with a brightness (energy) that is dependent only on the optical gain of the photon-multiplication device. Because the laser beam is not image-forming in itself (i.e., most of the power used to produce the image is provided by the emissive screen), a single low-power laser (or a small number of parallel lasers nominally the same wavelength or different wavelengths) may be used to generate a color image. Thus, the cost and safety issue related to conventional laser-based displays is addressed by facilitating the use of "safe" (i.e., low power) lasers that generate any visible, near UV or UV wavelength. Moreover, because pixel addressing is performed by scanning and modulating the laser beam using the laser addressing system, the emissive screen does not require an active or passive matrix backplane to address the light-emitting pixels, thus facilitating production of the emissive screen using low-cost screen printing and blanket coating techniques. Accordingly, the present invention facilitates the production of displays including very large (e.g., 60" or more) emissive screens that both avoid the safety issues associated with conventional laser-based projection displays, and can also be produced at a substantially lower cost than any conventional laser-based, CRT and LED display.

In one embodiment, the emissive screen includes spaced-apart photocathode and photoanode plates that are produced using inexpensive screen-printing or blanket coating techniques. The photocathode plate includes a glass pane with a conductor layer formed on its inside surface, and a photocathode material formed on the conductor layer. The photoanode plate includes a second glass pane having a second conductor layer formed on its inside surface, and a photoanode layer including blue, green, and red luminescent regions printed or otherwise formed on the second conductor layer. In a reflective-type arrangement, the laser beam passes through the photoanode plate to activate a selected photocathode region, and the resulting visible light is emitted back through the photoanode plate (i.e., toward the laser beam source). In a transmissive-type arrangement, the laser beam passes through the backside of the photocathode plate to activate a selected photocathode region, and the resulting visible light is emitted back through the photocathode plate (i.e., toward the laser beam source). In yet another embodiment, the laser beam passes through the back side of the photocathode plate to activate a selected photocathode region, and the resulting visible light is emitted through the photoanode plate (i.e., away from the laser beam source).

In another embodiment, the emissive screen includes pixels having spaced-apart, hexagonal luminescent regions that define central apertures for passing the laser beam to the pixel's photocathode. The apertures facilitate the use of relatively low energy laser beams by facilitating relatively unimpeded passage through the photoanode plate, and also relax the requirements imposed on the scanning system by limiting pixel activation to beam energy that passes through the relatively small apertures. The hexagonal luminescent regions are separated by a black border region that improves contrast, and thus image quality.

In other embodiments, different approaches are disclosed for increasing the spacing between the photoanode and photocathode plates, thereby facilitating the use of higher energy (and higher efficiency) phosphors. In one embodiment, doughnut-shaped (annular) anode electrodes are formed under the hexagonal luminescent regions to focus the freed electons such that they only activate the luminescent region of the addressed pixel. In another embodiment, a "honeycomb" stand-off plate is mounted between the photocathode plate and the photoanode plate. The stand-off plate defines passages that extend between the photocathode region and the luminescent region of an associated pixel, thereby acting as a conduit that directs electrons from the photocathode region to the associated luminescent region.

In another embodiment, inexpensive, molded millichannel plates are utilized to produce the desired photon-multiplication effect. These millichannel plates are similar to MicroChannel Plates (MCPs), which are utilized in second and third generation image enhancement systems to produce higher photon-multiplication. However, MCPs are only available in sizes that are substantially smaller than the large area display format of the emissive screen, and are also too expensive for practical use in such large area applications. The molded millichannel plates are similar to the honeycombed stand-off plates described above, but include channels coated with an electron-producing material, and utilize an applied high voltage potential to facilitate the desired photon-multiplication.

In accordance with another aspect of the present invention, a display apparatus includes a Position Sensitive Detector (PSD) that is provided on or next to the emissive screen, and is utilized to detect and measure the timing and coordinates of the impinging laser beam, and to transmit this timing/location data to the laser scanning/modulating system. The thus-produced closed-loop laser control system avoids the need for precise alignment between the laser addressing system and the emissive screen, and significantly relaxes the specification requirements (and thus the cost) of the scanning/modulating system over that required in an open-loop arrangement, thereby potentially significantly reducing manufacturing costs. In one embodiment, the PSD includes one-dimensional (1D) sensor strips mounted along the vertical edges of the emissive screen to detect a laser pulse generated at the start and end of each scan path. The 1D PSD strips detect the vertical location of the impinging beam at the beginning and end of each scan, for example, by detecting differential currents at each end of the ID PSD strips. Timing and location data generated associated with the detected beam are transmitted by wire or wireless transmission (e.g., infrared) to the laser scanning/modulating system, which uses the data to register (aim) the laser beam and to modulate the laser beam's energy. In addition to the side-located PSD strips, one or more 1D vertical PSD strips may be utilized inside the active display area (e.g., mounted behind the screen). Moreover, in another embodiment, the photocathode or photoanode layers of the emissive screen may be used to provide "free" two-dimensional PSD sheets that can be used to modulate the laser beam, thereby facilitating the use of a low-cost scanning system.

In accordance with yet another aspect of the present invention, ambient light is filtered to prevent generating unintended pixel activation. In one embodiment a filter coating is utilized to generate a high-pass optical filter that only passes light in the wavelength of the selected addressing laser. Another embodiment utilizes a spatial filter that only passes light received from the direction of the laser addressing system. Yet another embodiment utilizes electronic filtering to pass only signals having frequencies characteristic of the addressing laser.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
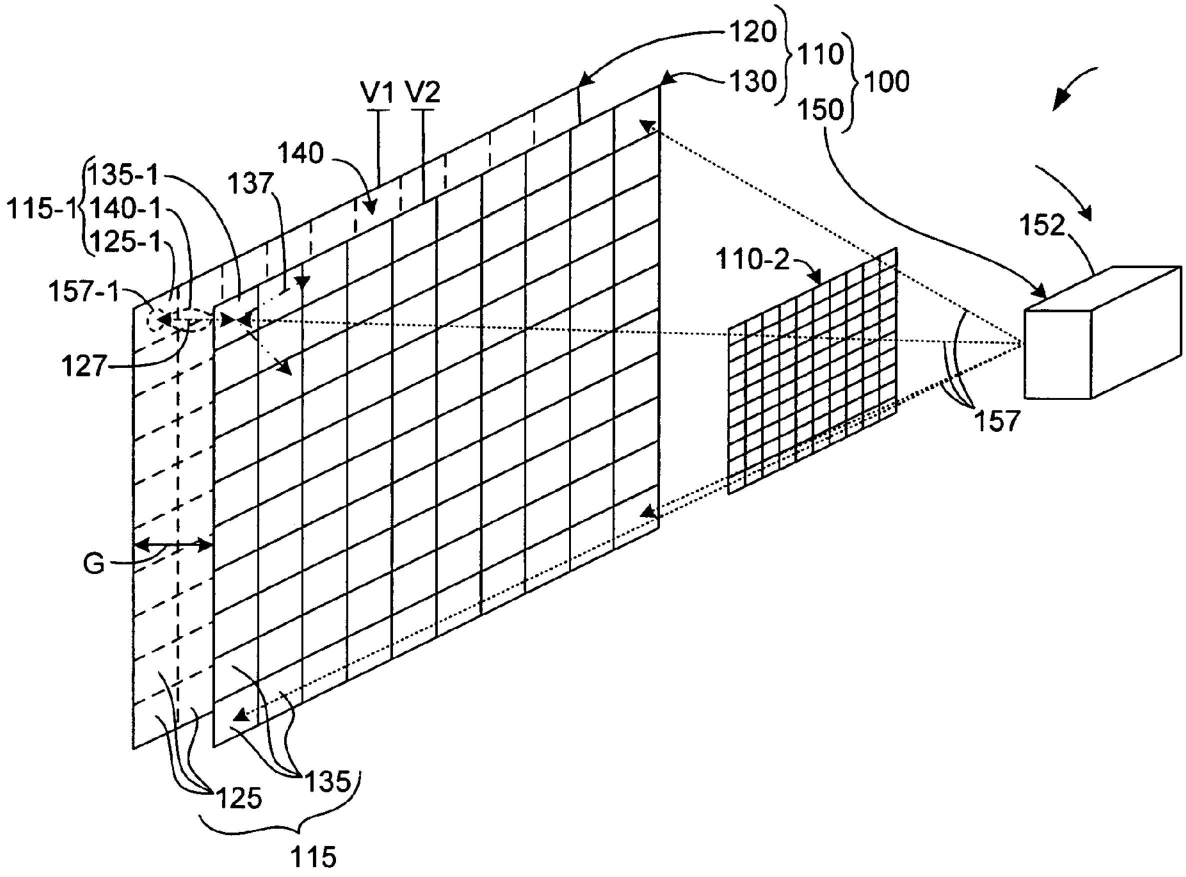
FIG. 1 is a perspective view showing a simplified display apparatus according to an embodiment of the present invention.

FIG. 1 depicts a simplified display apparatus 100 according to an embodiment of the present invention. Display apparatus 100 generally includes an emissive screen 110 and a laser addressing system 150 that directs a laser beam 157 onto emissive screen 110, and modulates laser beam 157 such that relatively high energy pulses are transmitted to selected regions of emissive screen 110, thereby causing emissive screen 110 to generate a desired image.

Emissive screen 110 includes an array of pixels 115 that include a simple photo-multiplier arrangement for emitting visible light in a manner similar to that utilized in so-called night-vision (i.e., image enhancement) systems. Emissive screen 110 includes a photocathode plate 120 and a photoanode plate 130 that are maintained at a high voltage potential during operation, with photocathode plate 120 coupled to a first, relatively low (negative) voltage source V1, and photoanode plate 130 coupled to a second, relatively high (ground or positive) voltage source V2. Both photocathode plate 120 and photoanode plate 130 are planar (flat) glass plates that are maintained in a parallel relationship (i.e., separated by a gap distance G) by appropriate edge structures (not shown), and fabricated such that a vacuum (or low pressure) region 140 is defined between photocathode plate 120 and photoanode plate 130. Photocathode plate 120 includes one or more layers of photocathode material (e.g., magnesium) that may be segmented (as indicated by dashed lines) into an array of photocathode regions 125. Photoanode plate 130 includes a corresponding array of luminescent regions 135, with each luminescent region 135 being spaced from a corresponding photocathode regions 125 by a corresponding portion of vacuum region 140. Each pixel 115 is formed by a photocathode region 125, the corresponding luminescent region 135, and the corresponding portion of vacuum region 140. For example, referring to the upper left portion of FIG. 1, pixel 115-1 includes photocathode regions 125-1, luminescent region 135-1, and an intervening portion 140-1 of vacuum region 140. Similar to first generation image enhancement systems, when photons impinge a pixel's photocathode 125, free electrons are locally generated that are accelerated across vacuum gap 140 by the applied electric field (E-field), and cause the pixel's luminescent regions 135 to emit visible light. In particular, in response to the incoming photons, free electrons are created on the surface of the pixel's photocathode 125 by way of the photo-electric effect, and the E-field generated by the applied high voltage potential accelerates these free electrons to high energy. The high energy electrons cross vacuum gap 140 and impact luminescent material (e.g., phosphor) provided in the pixel's luminescent regions 135, causing the luminescent material to emit visible light. This sequence is depicted by pixel 115-1 in FIG. 1, where free electrons 127 generated by photocathode regions 135-1 accelerate across portion 140-1 of vacuum region 140 toward luminescent region 125-1, which in turn generates visible light 137 that generates a localized light point on emissive screen 110. This simple photo-multiplier arrangement can be used to generate optical gains on the order of tens to several hundred times the impinging beam energy. As discussed in additional detail below, second or third generation image enhancement technology may be utilized to generate even higher optical gains.

Laser addressing system 150 is similar to laser systems utilized in conventional laser-based displays in that laser system 150 includes a scanning/modulating apparatus 152 that raster scans laser beam 157 in a predetermined two-dimensional pattern across the pixel array of emissive screen 110, and modulates laser beam 157 to selectively transmit high energy pulses to selected pixels 115 of emissive screen 110. In one embodiment, the scanning and modulating functions performed by scanning/modulating apparatus 152 are similar to those performed in conventional laser systems, and electromechanical systems utilized to provide these functions are therefore well known to those skilled in the art. Such systems may be formed, for example, using semiconductor lasers, collimation/focusing optics, two-dimensional (2D) scanning systems, and electronics for laser modulation that are well-known to those skilled in the art. Many implementations of 2D optical scanners are known in the art. One example of a suitable embodiment for a large projection TV type display apparatus might be a small spinning polygon mirror for the fast horizontal direction in combination with a micromachined galvo scanner operated in mechanical resonance for the slow vertical direction. Note that the scanner doesn't require any particularly tight specifications (e.g., linearity, angular accuracy, repeatability, drift, etc.) when a position sensitive device (described in detail below) is utilized to determine the location of the impinging beam. Such a scanner can be considered as the display equivalent of "reflex printing" in xerography, and could provide a very inexpensive type of scanner.

Figure 2:
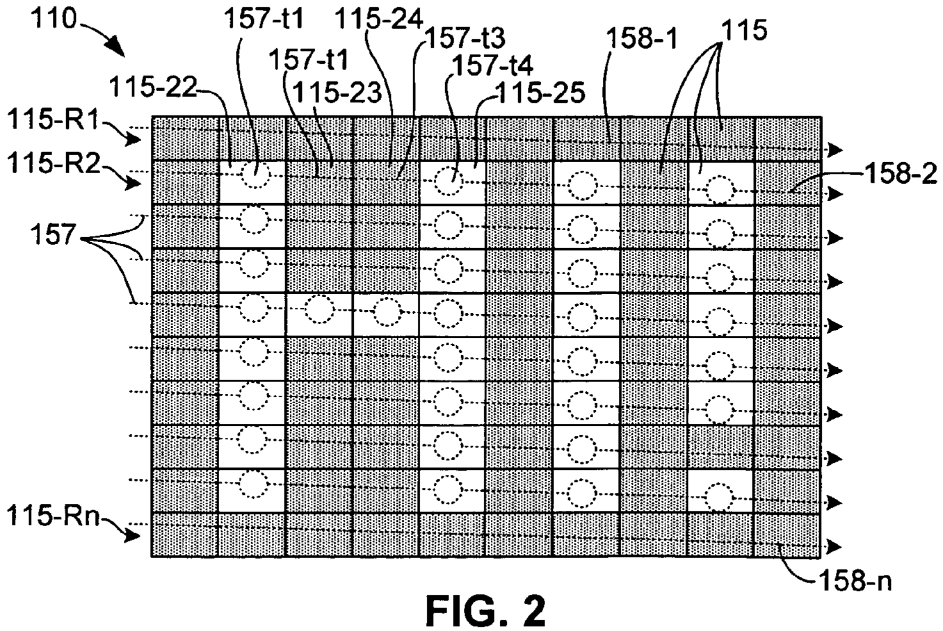
FIG. 2 is a front view showing a simplified emissive screen of the display apparatus of FIG. 1.

FIG. 2 illustrates an exemplary raster scan pattern provided by scanning/modulating apparatus 152. The diagonal dotted lines indicate a sequential series of scan paths 158 traced by the laser beam across the surface of emissive screen 110. For example, a first scan path 158-1 is traced by the laser beam from left to right across the uppermost row 115-R1 of pixels 115. The laser beam is then reset and traces a second left-to-right scan path 158-2 across a second row 115-R2. This reset/path-tracing process is repeated until the laser beam traces a scan path 158-n across a lowermost pixel row 115-Rn, at which point scanning/modulating apparatus 152 resets the laser beam, and the raster scan pattern is repeated.

FIG. 2 also illustrates modulation of the laser beam by scanning/modulating apparatus 152 to produce a desired image. As suggested above and described in additional detail below, photons provided by the laser beam are utilized to "activate" selected pixels by stimulating the photon-multiplication devices associated with the selected pixels. As such, modulation of the laser beam involves controlling the laser to transmit a relatively high-energy pulse as the laser beam scans across selected pixels, and turning off the laser (or transmitting a beam having insufficient energy to activate the photon-multiplication devices) when the laser beam scans across non-selected pixels. Referring to FIG. 2, selected pixels are white (indicating visible light emission), and non-selected pixels are relatively dark. As the laser beam is directed along scan path 158-2, the laser beam is modulated to generate high energy pulses in a time-based manner such that selected pixels in row 115-2 are activated. For example, the laser beam generates a high-energy pulse 157-t1 (i.e., laser beam 157 at a time t1) that impinges on pixel 115-22, thereby causing pixel 115-22 to activate and generate visible light. As the laser beam continues along scan path 158-2, the laser beam is turned off (or low) as it scans over pixel 115-23 (indicated by line 157-t2) and over pixels 115-24 (indicated by line 157-t3), thereby causing these pixels to remain dark (turned off). Then, when the laser beam reaches the next selected pixel (e.g., pixel 115-25), the laser beam is turned on to generate high energy pulse 115-t4, thereby causing pixel 115-24 to activate and generate visible light. By selectively modulating (turning on and off) the laser beam as it is scanned over emissive screen 110, emissive screen 110 is controlled to generate a desired image (e.g., as shown in FIG. 2, the message "HI!").

As set forth above, laser beam 157 is not image-forming in itself, as in conventional reflective laser-based projection displays, but is merely used to address (i.e., produce local light emission from) the pixels of emission screen 110. Accordingly, by forming emissive screen 110 to include red, green, and blue pixels (i.e., pixels having luminescent regions formed, for example, by red, green, and blue phosphor material), display apparatus 100 provides a full color display system in which laser addressing system 150 may be implemented using a single laser or small group of parallel lasers having nominally the same (e.g., violet, ultraviolet (UV), near-UV, or visible) wavelength. That is, unlike conventional reflective laser-based projection displays that require the use of red, green and blue lasers to produce a full color image, a single laser wavelength may be used to activate red, green and blue pixels of emissive screen 110, thereby facilitating the use of a substantially lower cost laser system than that used in conventional laser-based systems. Further, the intensity (energy) of the light emitted by emission screen 110 is substantially higher than the incident laser beam (i.e. emissive screen 110 has built-in optical gain). Therefore, according to another aspect of the present invention, display apparatus 100 is able to produce high quality images using a relatively low-power laser (i.e., substantially lower power than that used in reflective-type laser-based displays), thereby avoiding the safety issues associated with conventional laser-based projection systems by facilitating the use of lasers that meet established safety requirements. Thus, safety-rated violet, UV, near-UV and visible lasers may be used to form residential embodiments of display apparatus 100.

According to another aspect of the present invention, by solely utilizing laser addressing system 150 to activate selected pixels, emissive screen 110 may be fabricated using inexpensive, high yield fabrication methods that facilitate scalability. In particular, similar to projection screens, emissive screen 110 does not require an active or passive matrix backplane to address the light-emitting pixels. Accordingly, emissive screen 110 can be produced by screen-printing the luminescent material (e.g., phosphors), and blanket coating all other materials (e.g., photocathode materials, conductive layers, and spacer materials). Thus, the size of emissive screen 110 is not limited by whatever large-area processing equipment is available at the time, thereby avoiding the relatively high costs and low production yield associated with the use of such equipment. The present inventors believe that the absence of any kind of matrixed backplane, active or passive, and the absence of large-area processing lines to be kept up-to-date, might dramatically reduce the cost of emissive screen 110 in comparison to conventional display alternatives. The cost advantage would only get larger for increasing screen sizes. Further, cost efficiencies arise from the ability to use a single laser system to implement displays of several sizes. For example, referring to FIG. 1, laser addressing system 150 can be utilized to address the relatively large emissive screen 110, thus producing a relatively large display apparatus, or utilized to implement a relatively small display apparatus using a relatively small emissive screen 110-2.

Additional features and aspects of display apparatus 100 will now be described with reference to several exemplary embodiments.

Figure 3:
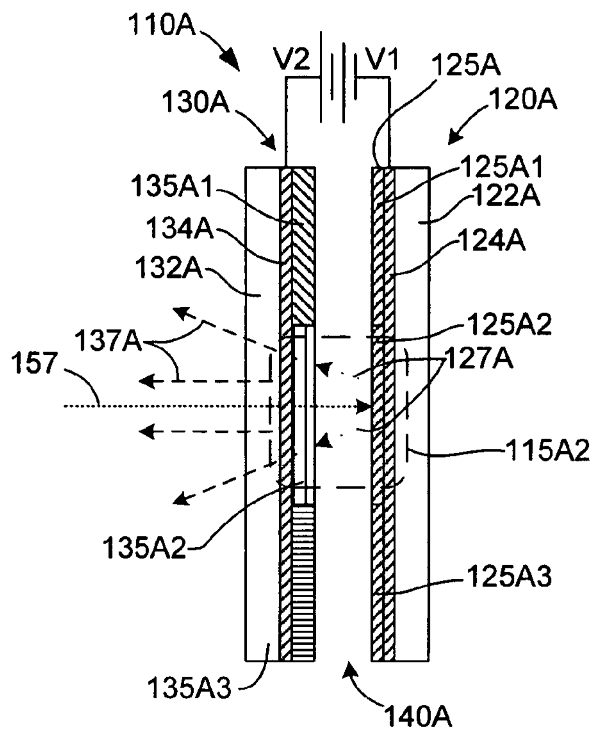
FIG. 3 is a cross-sectional side view showing a reflective type emissive screen according to another embodiment of the present invention.

FIG. 3 is a cross-sectional side view showing a portion of a reflective-type emissive screen 110A including a photocathode plate 120A and a photoanode plate 130A that are sealed along their edges (not shown), and constructed such that a vacuum region 140A is maintained between the plates.

Photocathode plate 120A includes a first flat glass pane 122A, a first conductive layer 124A formed on an inside surface of glass pane 122A, and a photocathode layer 125A formed on conductive layer 124A (for descriptive purposes, photocathode layer 125A is indicated by a first region 125A1, a second region 125A2, and a third region 125A3). Photocathode material layer 134A includes, for example, at least one of an alkali glass, a semiconductor material, and a glass doped with at least one of magnesium and aluminum. Note that there may be real or perceived safety issues with scanning violet, UV or near-UV laser light in living rooms, even at low power. If so, it should be possible to use a longer wavelength laser, in the visible, maybe even red wavelengths. Photocathode materials with lower work functions are needed in this case (e.g., potassium (K) or sodium (Na) doped glass, instead of Al or Mg, carbon nanotubes or carbon powder, or materials with even lower work functions, such as diamond like carbon).

Photoanode plate 130A includes a second flat glass pane 132A that is parallel to first glass pane 122A, a second, transparent conductive layer 134A (e.g., indium-tin oxide (ITO)) formed on an inside surface of glass pane 132A, and luminescent regions formed on conductive layer 124A. The luminescent regions include a green region 135A1 that is located opposite to photocathode region 125A1, a blue region 135A2 that is located opposite to photocathode region 125A2, and a red region 135A3 that is located opposite to photocathode region 125A3. These red, green, and blue luminescent regions are formed using fluorescent quantum dot nanoparticles produced, for example, by NanoSys Inc. of Palo Alto, Calif., USA. An inexpensive fabrication method involves using such nanoparticles with clear polymer binder that is screen printed in three passes onto a thin carrier sheet. Similar approaches are possible using phosphors and appropriate dyes or pigments.

As depicted at the upper portion of FIG. 3, during operation, a high voltage potential is applied between conductive layers 124A and 134A, thus producing a high energy E-field in vacuum region 140. Subsequently, laser beam 157 (indicated by dashed line) is directed through photoanode plate 130A to activate selected portions of photocathode layer 125A in the manner described above. For example, FIG. 3 shows laser beam 157 activating blue pixel 115A2 by passing through conductive layer 134A and blue region 135A2 to second region 125A2. To facilitate this operation both conductive layer 134A and blue region 135A2 must be transparent to laser beam 157. As described above, laser beam 157 causes second photocathode region 125A2 to generate free electrons 127A that are accelerated by the applied E-field and impinge on blue region 135A2, thereby causing blue region 135A2 to emit blue light 137A that passes through glass pane 132A to produce a blue "spot" on emissive screen 110A. Note that conductive layer 134A must be formed from a transparent conductive material (e.g., ITO) to facilitate the emission of blue light 137A. This type of display can be envisioned as a planar, externally addressed cathode-ray tube (CRT), without the dimensional limitations of a standard CRT. In this embodiment, the laser would pass as shown, but the image would be viewed through the "rear" glass plate 132B.

Note that the wavelength/color of the visible light emitted by emission screen 110A depends on which luminescent region is "selected". Those skilled in the art will recognize that selecting the red, green, and blue pixels in an appropriate sequence and frequency will produce a desired color (e.g., simultaneously selecting adjacent red and blue pixels produces an apparently purple dot on the screen surface).

Figure 4:
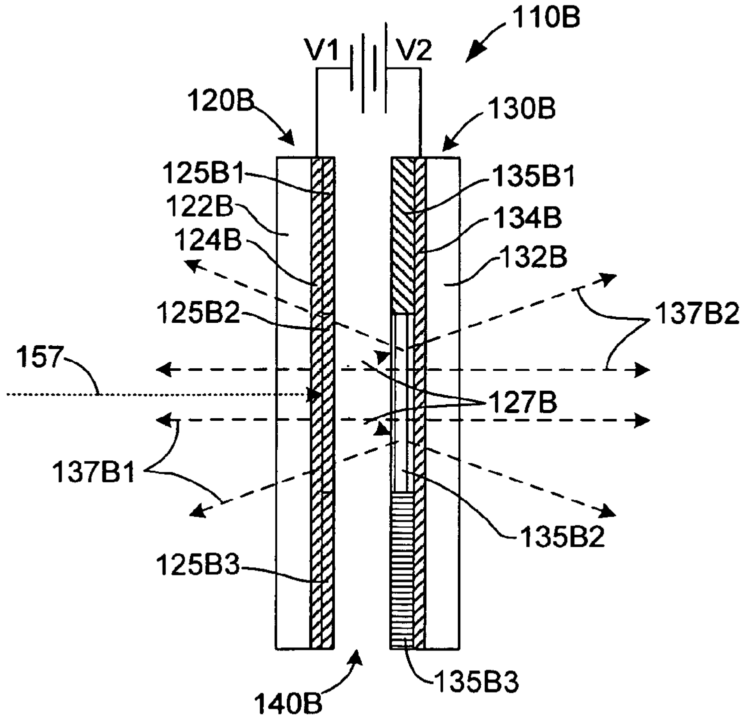
FIG. 4 is a cross-sectional side view showing a transmissive type emissive screen according to another embodiment of the present invention.

FIG. 4 shows a portion of a transmissive-type emissive screen 110B including a photocathode plate 120B and a photoanode plate 130B that are sealed in the manner described above, but reversed with reference to the direction of incoming laser beam 157. Photocathode plate 120B and photoanode plate 130B are constructed essentially in the manner described above, and corresponding structures are indicating with similar reference numerals having "B" instead of "A" suffixes. During operation, laser beam 157 is directed through glass pane 122B of photocathode plate 120B to activate photocathode region 125B2. To facilitate this operation conductive layer 124B must be transparent to laser beam 157. Photocathode region 125B2 generates free electrons that impinge on blue luminescent region 135B2, thereby producing blue visible light 137B1 that passes through photocathode plate 120B (i.e., to the left in FIG. 4). Note that, in this case, conductive layer 124B must be formed from a transparent conductive material (e.g., ITO) to facilitate the emission of blue light 137B1.

In addition to the projection-like arrangement depicted in FIG. 3 and on the left side of FIG. 4, emissive screen 110B may also be utilized as a CRT-like display in which laser beam 157 enters from the left, and visible light rays 137B2 are emitted from the "front" glass pane 132B. This arrangement would require conductive layer 134B to be transparent.

Figure 5:
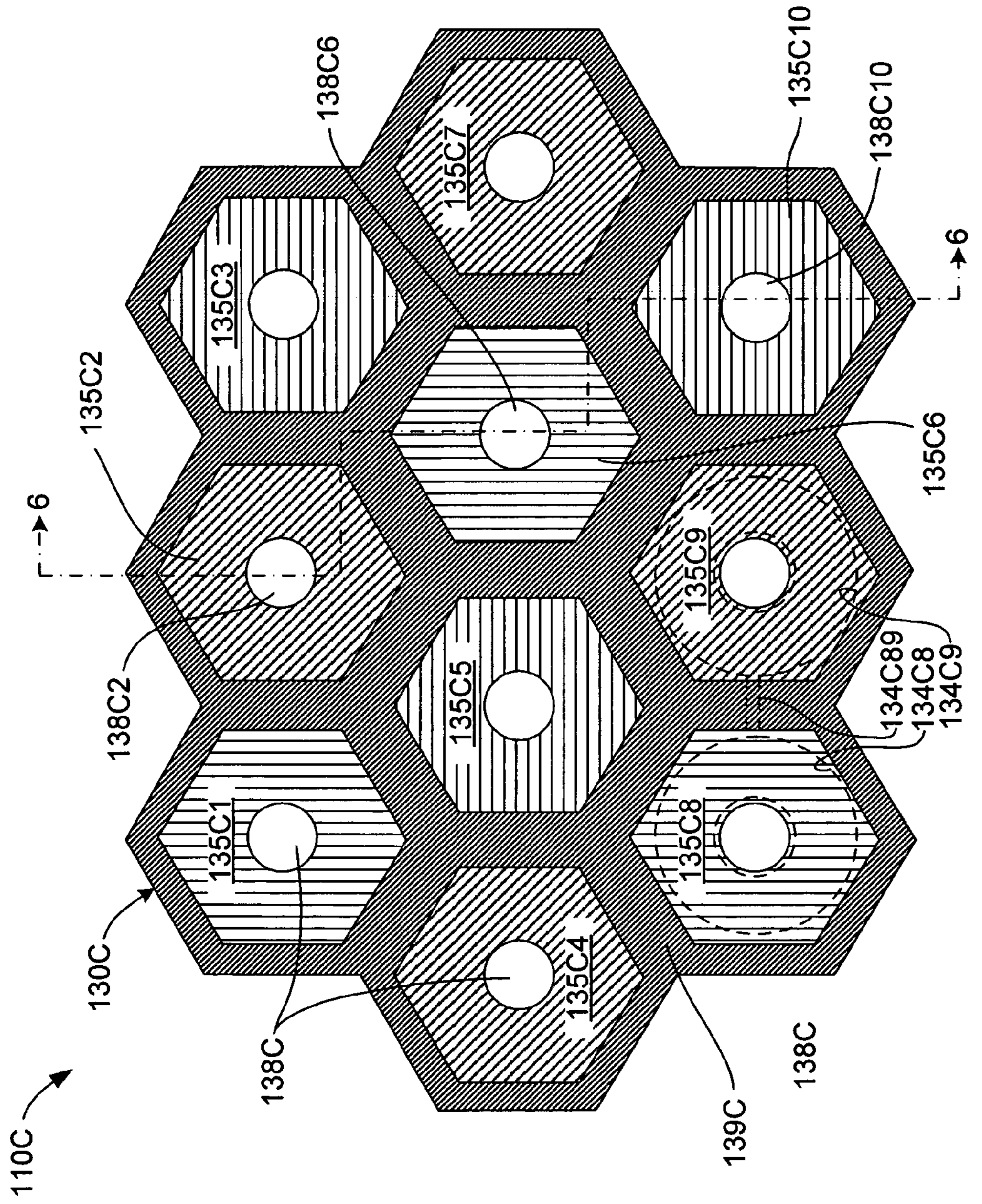
FIG. 5 is an enlarged front view showing a portion of an emissive screen including apertures according to another embodiment of the present invention.

FIG. 5 is a front view showing a portion of an emissive screen 110C according to another embodiment of the present invention. In particular, FIG. 5 shows a portion of photocathode plate 130C that includes spaced-apart hexagonal luminescent regions 135C1 through 135C10. Note that hexagonal luminescent regions 135C1 through 135C10 are arranged such that red-colored luminescent regions 135C1, 135C6 and 135C8 are indicated by vertical lines, green colored luminescent regions 135C2, 135C4, 135C7 and 135C9 are indicated by diagonal lines, and blue-colored luminescent regions 135C3, 135C5 and 135C10 are indicated by horizontal lines. In one embodiment compatible with conventional large-screen televisions or conference room projection systems, each luminescent region 135C1 through 135C10 is approximately 0.4 mm in diameter, and is spaced from its adjacent neighbors by a border region 139C approximately 0.1 mm in width, thus providing a pixel pitch of approximately 0.5 mm.

According to another aspect of the present invention, each of luminescent regions 135C1 through 135C10 defines a central, circular aperture 138C for passing the laser beam to a selected pixel's photocathode. As discussed below, the aperture may be covered by a filter material, but at any rate are substantially transparent to the incoming laser beam, thereby facilitating the use of relatively low energy lasers by allowing substantially unimpeded passage of the beam through photoanode plate 130. Note that, in the previous embodiments, the laser beam was required to pass through one or more conductive, luminescent and/or photocathode layers. Apertures 138C also relax the requirements imposed on the laser scanning system by preventing pixel activation unless the laser beam passes through the aperture. For example, when luminescent regions 135C1 through 135C10 have diameters of 0.4 mm, providing an aperture having a diameter of approximately 0.125 mm facilitates the use of an incident laser beam having a diameter up to 0.35 mm without risk of exposing more than one aperture at a time, regardless of spot position. This further relaxes the requirements imposed on the laser scanning system, and one approach might be to slightly overlap the scans to make sure the entire photoanode area is covered.

According to another aspect of the present invention, luminescent regions 135C1 through 135C10 are separated by a black (or other dark color), non-luminescent border region 139C. As discussed above, the "blackness" of such border regions is found to be directly proportional to the contrast, depth and dynamic range of images generated by displays utilizing black pixel borders. By providing emissive screen 100C with sufficiently high optical gain, the problems associated with generating suitable images using black border region 139C are overcome, thus providing a potentially exceptional viewing experience without the need for high powered (and thus dangerous) lasers.

Figure 6:
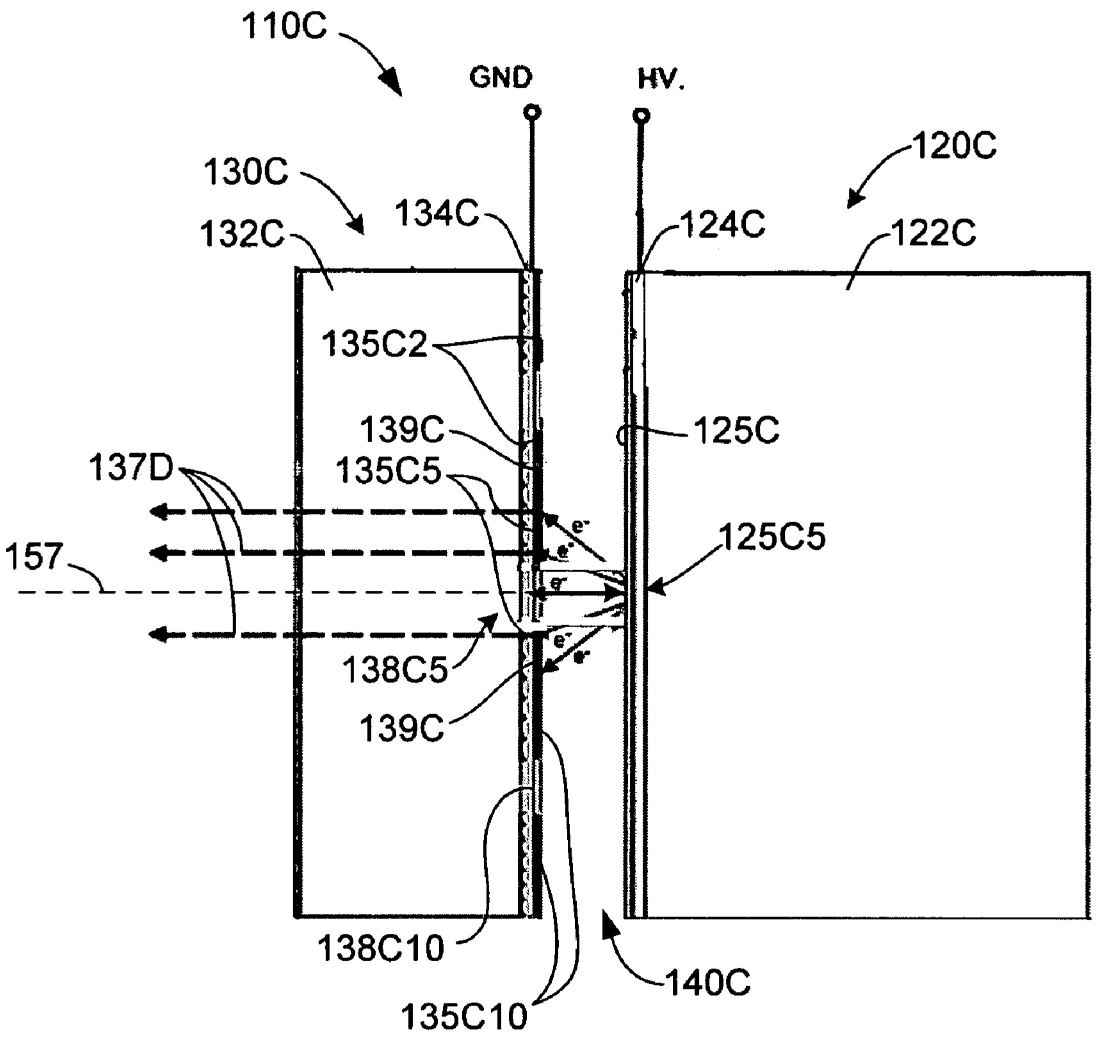
FIG. 6 is a cross-sectional side view showing an emissive screen according to another embodiment of the present invention.

FIG. 6 is a cross-sectional side view taken along section line 6-6 of FIG. 5 showing emissive screen 110C in additional detail. Similar to previous embodiments, emissive screen 110C includes a photocathode plate 120C separated from photoanode plate 130C (discussed above) by a vacuum region 140C. In one embodiment, photocathode plate 120C includes a glass pane 122C having a thickness of 1 mm, photoanode plate 130C includes a glass pane 132C having a thickness of 0.5 mm, and vacuum region 140C has as width of 0.1 to 0.3 mm. A high (negative) voltage –HV (e.g., –500V to –5000V or higher if possible without arcing or breakdown) is applied to conductor 134C and conductor 124C is connected to ground, thus maintaining a suitable voltage potential between photocathode layer 125C and luminescent regions 135C2, 135C5 and 135C10. To address red luminescent region 135C5, laser beam 157 is transmitted through aperture 138C5, thereby impinging photocathode layer 125C at location 125C5. The resulting free electrons (indicated by arrows labeled "$e^-$") are transmitted to red luminescent region 135C5, which in turn produces red visible light 137D. Note that free electrons that impinge on border region 139C are absorbed (i.e., no visible light is generated by the border region).

The maximum vacuum region spacing between luminescent region 135C5 and photocathode region 125C5 is limited by the divergence angle of the emitted electrons. In the embodiment of FIG. 6, if vacuum region 140C is too wide, the diverging electrons will impinge on adjacent pixels (e.g., luminescent regions 135C2 or 135C10), causing these pixels to emit visible light. However, it is advantageous to have a larger anode-cathode spacing because of phosphor efficiency and longevity considerations. It is known in the art that "high-energy" (e.g., 10 keV) phosphors are considerably more efficient than "Low-energy" phosphors (e.g. 1-5 keV). However, higher energy phosphors can only be used with an anode-cathode gap larger than the breakdown spacing at their voltage rating. Cathode-ray tubes (CRT) and Field Emission Displays (FEDs) are the two extremes as far as anode-cathode gap is concerned. CRTs operate under higher-voltage/lower-current conditions than FEDs. CRTs can use higher energy phosphors; FEDs are forced to use low energy phosphors. Higher current is needed in FEDs to achieve brightness. The higher current is known to lead to accelerated phosphor degradation.

In accordance with another embodiment of the present invention, the conductive layer formed on the photoanode plate includes a series of doughnut-shaped (annular) anode electrodes (as opposed to a blanket coating) that focuses the freed electrons toward the addressed (targeted) luminescent region, thereby avoiding unwanted activation of adjacent pixels. Referring to the lower left corner of FIG. 5, annular anode electrodes 134C8 and 134C9 (indicated by dashed lines) are respectively positioned underneath luminescent regions 135C8 and 135C9. A narrow conductor 134C89 connects anode electrodes 134C8 and 134C9. As indicated in FIG. 5, the outer diameter of each anode electrodes 134C8 and 134C9 is smaller than the diameter of its corresponding luminescent region 135C8 and 135C9, and the inside diameter of anode electrodes 134C8 and 134C9 is larger than corresponding apertures 138C8 and 138C9. Although omitted from FIG. 5, this pattern of linked annular electrodes covers the entirety of photoanode plate 120C, and is connected to the ground (GND) source, as indicated in FIG. 6.

As mentioned above, this arrangement facilitates a larger vacuum region spacing by focusing the applied E-field toward the addressed pixel, away from adjacent pixels, thus facilitating larger vacuum region spacing and the use of higher energy phosphors. A shielding conductor pattern disposed between neighbors and biased at an appropriate voltage would further reduce cross talk.

Figure 7:
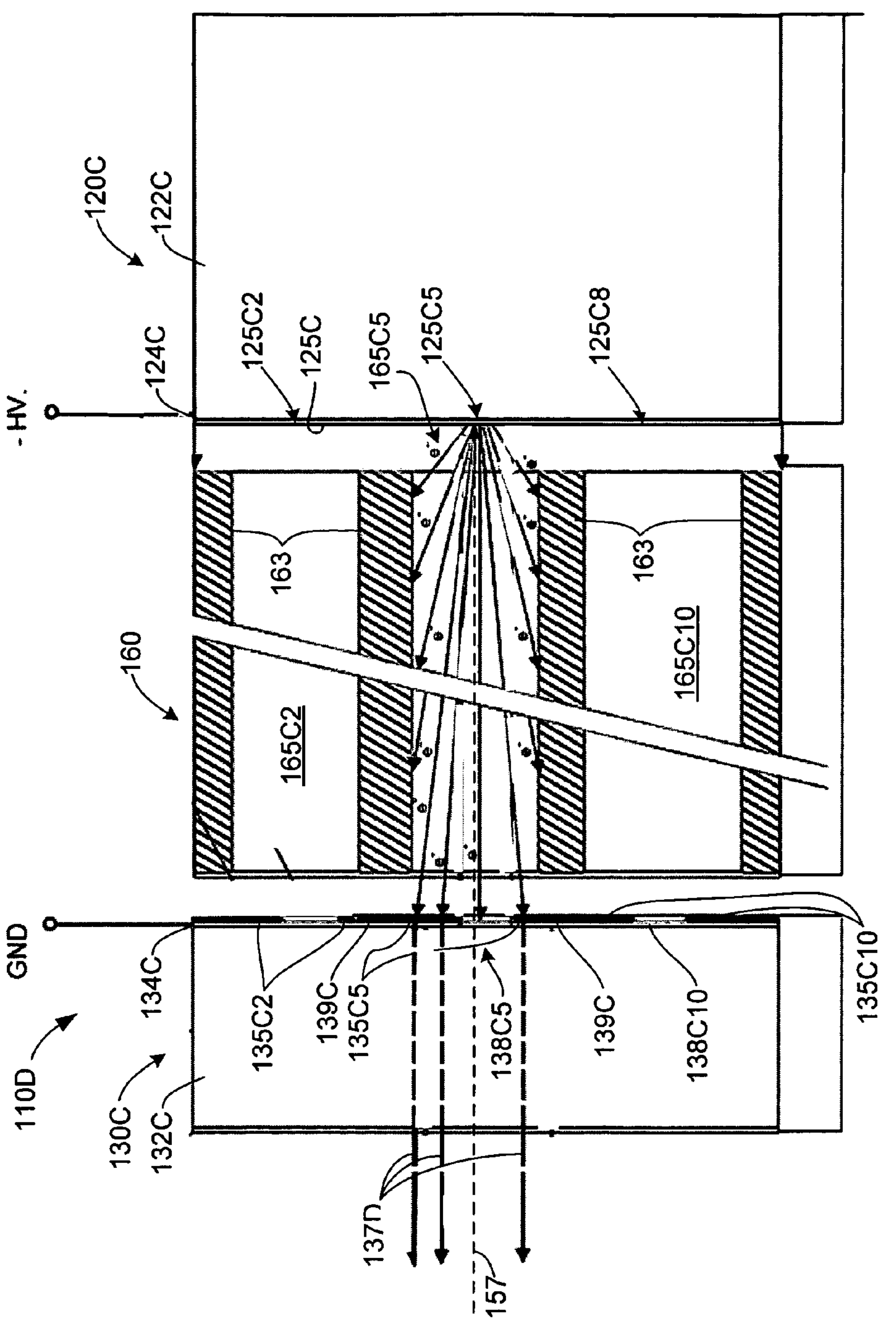
FIG. 7 is a cross-sectional side view showing an emissive screen according to another embodiment of the present invention.

FIG. 7 is a cross-sectional side showing an emissive screen 110D according to another embodiment of the present invention. For brevity, emissive screen 110D utilizes photocathode plate 120C and photoanode plate 130C, both described above. Emissive screen 110D differs from previous embodiments in that it includes a "honeycomb" stand-off plate 160 mounted between photocathode plate 120C and photoanode plate 130C. That is, stand-off plate 160 includes an array of "honeycombed" walls 163 that define passages extending between each luminescent region of photoanode plate 130C and corresponding photocathode regions of photocathode plate 120C. For example, stand-off plate 160 includes a passage 165C2 extending between a luminescent region 135C2 and photocathode region 125C2, a passage 165C5 extending between a luminescent region 135C5 and photocathode region 125C5, and a passage 165C8 extending between a luminescent region 135C8 and photocathode region 125C8. As such stand-off plate 160 physically separates the electron paths from adjacent pixels, and prevents diverging electrons from activating neighboring pixels. That is, walls 163 are formed from a passive material that does not multiply electrons through secondary emission. In fact, a substantial fraction of the electrons will be lost through collisions with walls 163. However, as indicated in the center of FIG. 7, stand-off plate 160 facilitates considerably larger spacing between photocathode plate 120C and photoanode plate 130C (e.g., in the range of 1 to 5 mm, thereby allowing the use of higher efficiency phosphors with longer longevity. If walls 163 are formed using a dielectric material, it may be possible that the wall material will become negatively charged by impinging electrons, which would repel subsequent electrons. The charged walls would effectively form an electrostatic lens that focuses the electrons down the center of each passage, towards the associated luminescent region.

The embodiments described above have relied on first generation image enhancement technology to provide the photon-multiplication utilized by the various emission screens. The following example illustrates the use of second generation image enhancement technology to generate higher optical gains than that possible using first generation technology. However, the examples disclosed herein are not intended to be limiting, and those skilled in the art will recognize that any suitable image enhancement technology may be beneficially utilized to produce an emission screen in accordance with the present invention.

Figure 8:
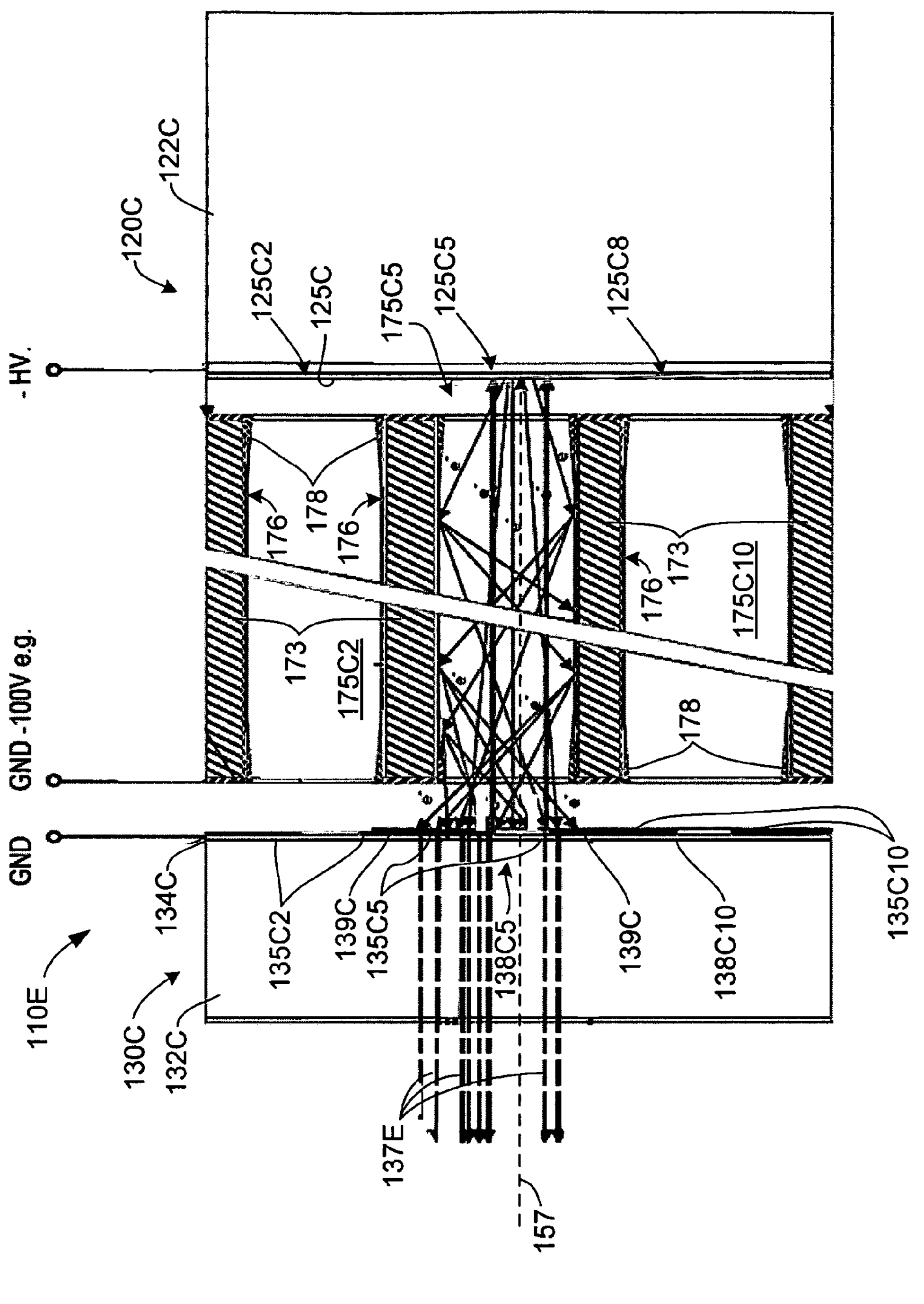
FIG. 8 is a cross-sectional side view showing an emissive screen according to another embodiment of the present invention.

FIG. 8 is a cross-sectional side showing an emissive screen 110E according to another embodiment of the present invention. Similar to the previous embodiment, emissive screen 110E utilizes photocathode plate 120C and photoanode plate 130C, both described above. Emissive screen 110E differs from previous embodiments in that it includes a crude Micro Channel Plate (MCP) 170 mounted between photocathode plate 120C and photoanode plate 130C. MCP 170 is similar to stand-off plate 160 (described above) in that it includes an array of "honeycombed" walls 173 that define channels extending between each luminescent region of photoanode plate 130C and corresponding photocathode regions of photocathode plate 120C. For example, MCP 170 includes a channel 175C2 extending between a luminescent region 135C2 and photocathode region 125C2, a channel 175C5 extending between a luminescent region 135C5 and photocathode region 125C5, and a channel 175C8 extending between a luminescent region 135C8 and photocathode region 125C8. However, MCP plate 170 differs from the previously described stand-off plate in that walls 173 are coated with an efficient secondary electron emission material 176 to multiply the number of electrons generated by photocathode layer 125C, as indicated by the emission shown in channel 175C5. The mechanical structure and dimensions of MCP 170 needed for the embodiment shown in FIG. 8 are similar to those described above, and hence the term "millichannel Plate" may be more appropriate.

MCPs for conventional second and third generation image enhancement systems are quite expensive, and only available in small sizes. Such MCPs are typically made of high-efficiency (1000-10000× gain) secondary electron emission alkali glasses with pores in the 10-20 micron diameter range. They are made by pulling a large bundle of alkali glass tubes to thinner and thinner diameters and finally slicing the bundle into plates. More recently, silicon based MCPs have become popular. In the present embodiment, MCP 170 represents a crude version of these high gain MCPs in that MCP 170 provides only modest gain (e.g. order of 10× electron multiplication, in addition to 10× gain from the HV electron acceleration), and much larger hole sizes is all that is needed, but it needs to be inexpensive and scale inexpensively to large areas.

Important material properties for both MCP 170 and stand-off plate 160 (described above) are: (1) no outgassing under vacuum, (2) high electrical resistivity, because of the high voltage across the plate, (3) thermal expansion coefficient matched to the glass used for front & back panels, and (4) reflective sidewalls or light colored light-scattering sidewalls. In addition, the MCP 170 includes secondary electron emission material 176 (i.e., a material such as MgO having high secondary electron emission yield). Many other suitable secondary electron emission materials are known in the art. Finally, both top and bottom of the MCP 170 include metalization 178 for contacting purposes. Metalization 178 typically partially penetrates into the channels, and this is known to be advantageous for electron collimation at the exit side. A high voltage is applied across the top and bottom surface. Tailored conductivity (typically a few hundred MΩ top to bottom) of the plate bulk material (leaded alkali glass) provides a path for supplying the secondary electrons to the sidewall without drawing excessive shunt current. Alternatively, the bulk material is highly insulating, but coated with a conductor with appropriate conductivity prior to coating with the electron emission material. The requirements of no-outgassing (1) and expansion matching (3) point towards glasses and ceramics, and away from polymers. Glasses and ceramics are notoriously difficult to machine, but molding of glass or ceramic for the honeycombs may be an option given that the required hole diameter is relatively large. Sintering glass frits in a "bed-of-nails" mold is a possibility, but a moldable ceramic called Mykroy-Micalex seems particularly promising. The material contains no polymers (mixture of glass frit and mica particles) but can be molded as a plastic. The dimensional tolerances are very tight and the thermal expansion coefficient is well matched. By appropriate selection of the glass frit or by addition of appropriate additive materials in the mix, the electrical resistivity may be controlled to within a range needed for MCP 170. The molded ceramic panes may be used as-is as passive collimator, or coated with electron emission material and metallized for use as a coarse MCP. Thickness of the plates might be in the range of 5-10 mm.

In accordance with another aspect, display apparatus constructed in accordance with the present invention may utilize an open loop scanning/modulating system (e.g., as depicted in FIG. 1), but are more preferably utilize a closed loop scanning/modulating system, such as those set forth in the following embodiments. That is, while open loop laser beam scanning/modulating is possible through carefully aligning the laser addressing system with the emissive screen, a more practical approach involves detecting the impinging beam's location and timing, and utilizing this data to control the laser addressing system to modulate the laser beam, and to adjust the impinging beam's location (if necessary). Using such beam timing/location data to adjust the scanning/modulating of the laser addressing system avoids the need for precise alignment between the laser addressing system and the emissive screen, and significantly relaxes the specification requirements (and thus the cost) of the scanner/modulator over that required in an open-loop arrangement, thereby potentially significantly reducing overall manufacturing and installation costs.

Figure 9:
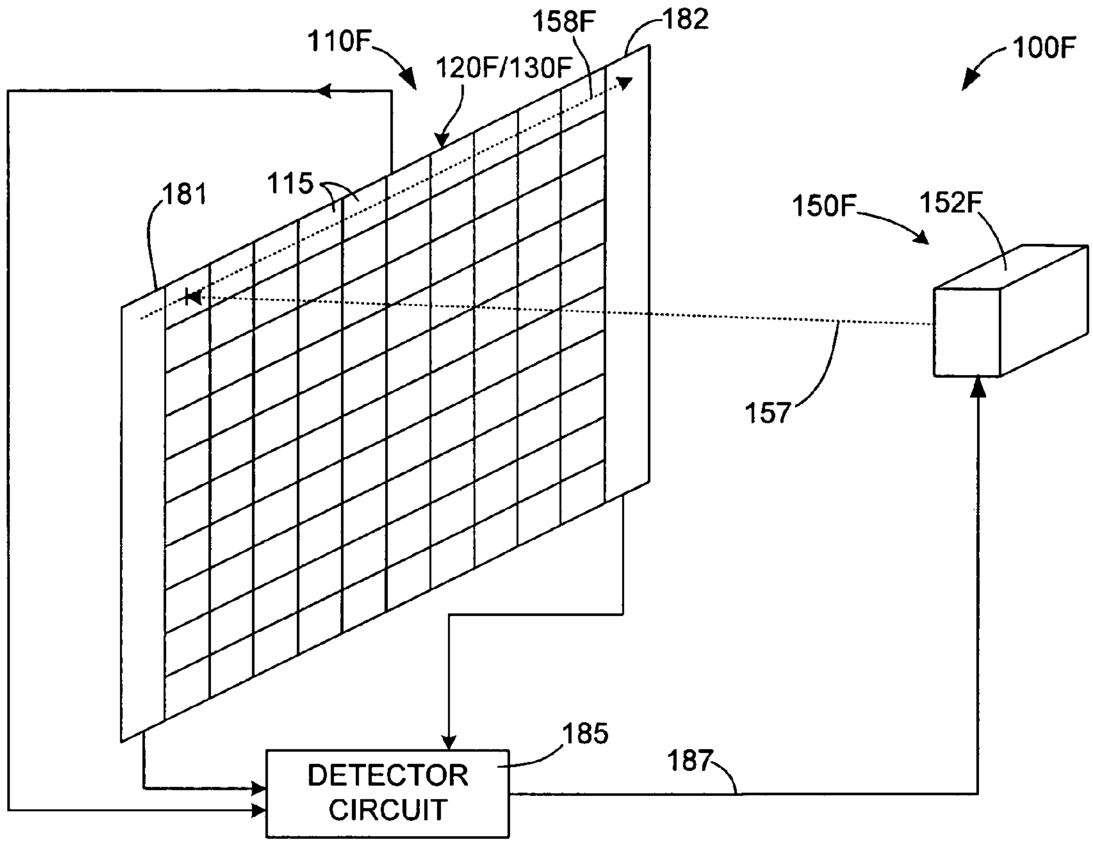
FIG. 9 is a perspective view showing a simplified closed loop display apparatus including a position sensitive device according to an embodiment of the present invention.
Figure 10:
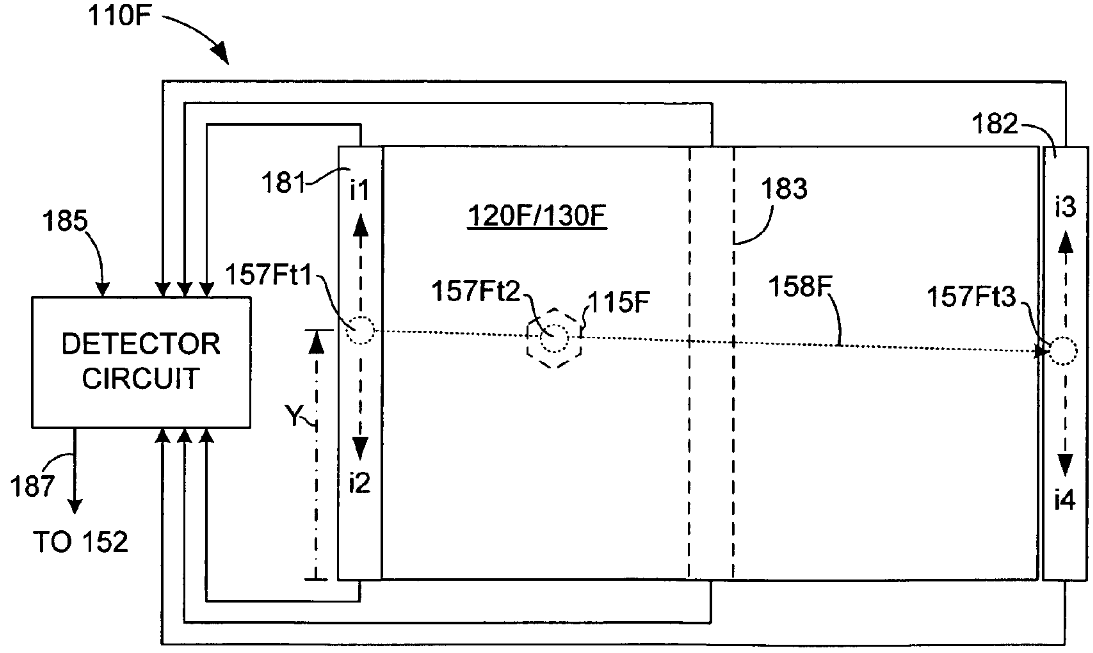
FIG. 10 is a simplified front view of an emissive screen including the position sensitive device of FIG. 9.

FIGS. 9 and 10 illustrate a display apparatus 100F including an emission screen 110F and a laser addressing system 150F that are connected in a closed-loop arrangement according to another embodiment of the present invention. Emission screen 11OF is constructed and operates substantially as described above, but includes a Position Sensitive Detector (PSD) mechanism to detect the location and timing of laser beam 157, and to transmit this data to scanning/modulating system 152F of laser addressing system 150F. This data, communicated via a suitable signal transmission path 187 in real time to laser scanning/modulating system 152, and in combination with source (image) data, is used to drive the laser modulation, hence reproducing the source data in color on emissive screen 110F without requiring any precise alignment between laser addressing system 150F and emissive screen 110F.

In accordance with the present embodiment, the PSD mechanism includes vertical, one-dimensional (1D) PSD strips 181 and 182 positioned along the side edges of the active screen area (i.e., the portion of emissive screen 110F formed by photocathode plate 120F and photoanode plate 130F; i.e., the portion defines the array of pixels 115). PSD strips 181 and 182 generate detection signals indicative of the timing and vertical location of laser beam 157 in the manner described below, and these detection signals are provided to a detector circuit 185, which in turn processes the detection signals for transmission to laser addressing system 150F. Referring to FIG. 10, PSD strips 181 and 182 are utilized to respectively detect a start-of-scan (SOS) laser pulse 157Ft1 and an end-of-scan (EOS) laser pulse 157Ft3, which are generated by laser system 150F at the start and end of each laser scan (e.g., laser scan 158F indicated by dashed arrow). The vertical position of each SOS and EOS laser pulse is detected by the differential current generated in the sensor material when the beam's energy is transferred to PSD strips 181 and 182. For example, the vertical location of laser pulse 157Ft1 is determined by comparing differential currents "i1" and "i2", and the vertical location of laser pulse 157Ft3 is determined by comparing differential currents "i3" and "i4". By providing this location information and scan time information (i.e., the time required to scan across screen 110F), the laser addressing system is capable of generating a high energy pulse 157Ft2 when the laser beam is aligned with a selected pixel 115F. One or more additional PSD strips (e.g., PSD strip 183) may be provided in the active screen area (e.g., between photocathode plate 120F and photoanode plate 130F) to detect an intermediate beam pulse, thereby providing higher resolution timing/location data for more precise control of the laser addressing system. Suitable sensor material for this purpose includes amorphous silicon (a-Si:H) on a plastic base, fax bars (line of optical detectors), photoreceptor material, or other light sensing materials and devices known in the art. The differential currents are passed to detector circuit 185, which processes the signals according to known techniques to produce timing/location data, which is then transmitted to scanning/modulating system 152 via signal transmission path 187. Fast real-time communication between the screen and the scanner is needed in order to synchronize the laser modulation with the measured spot position. In some embodiments, signal transmission path 187 may be implemented using a wired communication link. In other embodiments, signal transmission path 187 may be implemented using an untethered solution, such as hi-speed free-space IR signal or other wireless technology.

Figure 11:
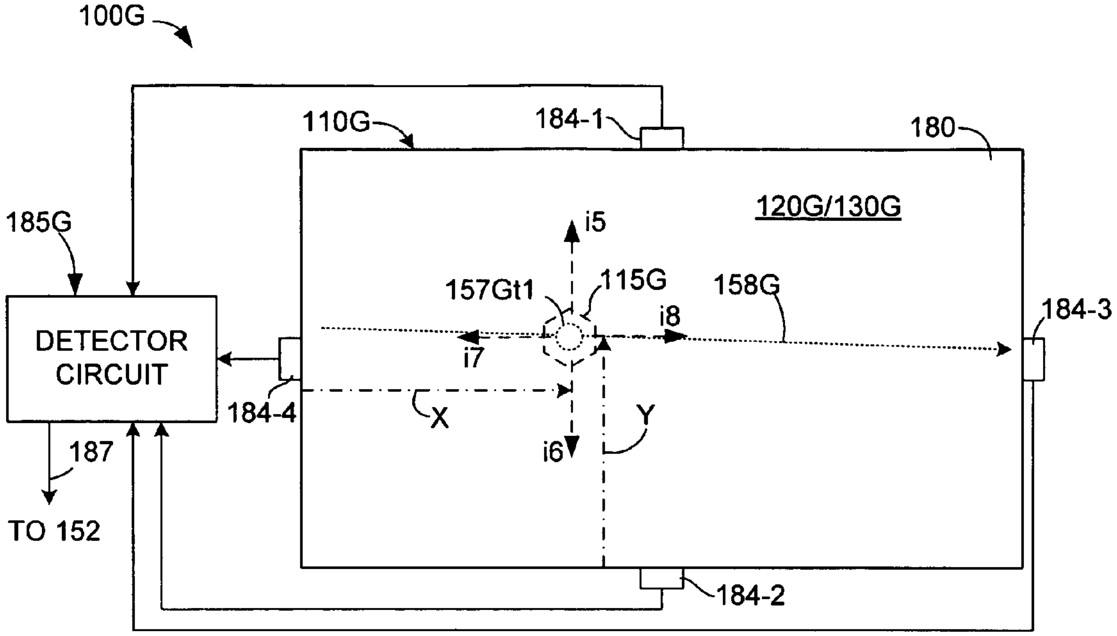
FIG. 11 is a simplified front view of an emissive screen including a position sensitive device according to another embodiment of the present invention.

FIG. 11 illustrates a second closed loop display apparatus 100G that utilizes portions of the photon-multiplier multiplier device incorporated into emissive screen 110G, which is constructed substantially as described above, to provide a "free" two-dimensional (2D) PSD device used to modulate the laser addressing system (not shown). In this embodiment, laser beam 157G is scanned at a relatively low energy level (i.e., an energy level that does not produce photon-multiplication), and selectively modulated to a relatively high energy level (i.e., an energy level that produces photon-multiplication, thus causing the emission of visible light from emission screen 110G). In one specific embodiment, electrodes 184-1 through 184-4 are located along the vertical and horizontal (top/bottom) edges of emissive screen 110G, and either the photocathode layer formed on photocathode plate 120G or the photoanode layer formed on photoanode plate 130G is utilized as a large differential PSD sheet. The instantaneous position of laser beam 157Bt1 is determined from the differential currents "i5" to "i8", which are generated in the photocathode/photoanode layer and transmitted through electrodes 184-1 through 184-4 to detector circuit 185G, which in turn utilizes these signals to determine the 2D (e.g., X and Y) coordinates of beam pulse 157Gt1, which are transmitted back to laser scanning/modulating system 152 via signal transmission path 187. When the 2D coordinates are identified by the image source data as corresponding to a selected pixel (e.g., pixel 115G, as shown in FIG. 11), laser beam 157Gt1 is modulated to a high energy by laser scanning/modulating system 152, thereby activating pixel 115G. Thus, the timing/location data is used to synchronize laser modulation with the beam position on emission screen 110G, thereby facilitating open loop (e.g., by causing the laser beam to overlap and cover the entire screen surface). This further reduces the specification requirements on laser scanning/modulating system 152, which further reduces its cost. Accordingly, the present inventors believe display apparatus 100G can be utilized to produce a 60" display costing as little as $500, as opposed to $10 k currently commanded for comparable laser-based projection systems.

According to another alternative embodiment, the differential currents utilized to locate the laser beam impingement position may also be utilized to determine both the laser beam energy (e.g., by measuring differential currents in the photocathode plate) and the pixel brightness (e.g., by measuring differential currents in the photoanode plate). In this embodiment, the sum of the collected currents in the photoanode plate at any given point in time is a measure of the electrons generated and, therefore, of the brightness of the corresponding pixel. This information can be used to calibrate out pixel non-uniformity, aging effects, or auto-adjust for ambient lighting conditions etc. In a similar manner, the collected currents in the photocathode plate can be used to measure the energy imparted by the laser beam to the emissive screen.

The unintended amplification of photons from ambient light (i.e., optical noise) is another issue that may present a problem to the operation of emissive screens formed in accordance with the present invention. Ambient light may be prevented from significantly effecting the operation of the emissive screen by operating the laser scanning/modulating system in a way that the power density from ambient light is insignificant relative to the time-averaged power density from the focused laser beam. Addressing the ambient light problem in this manner will probably be the main consideration dictating the lower bound on laser power and the upper bound on the photon-multiplier gain. However, although utilizing a relatively high laser power (i.e., relative to ambient light) may solve the ambient light problem, in some high ambient brightness situations, this solution may be unsatisfactory or undesirable due to the safety-related limits on laser brightness. The following paragraphs set forth other possible solutions to this potential problem.

Figure 12:
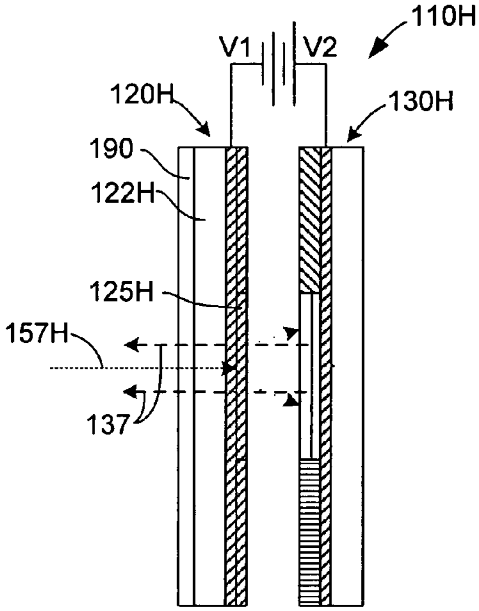
FIG. 12 is a cross-sectional side view of an emissive screen including an ambient light filter according to another embodiment of the present invention.
Figure 13:
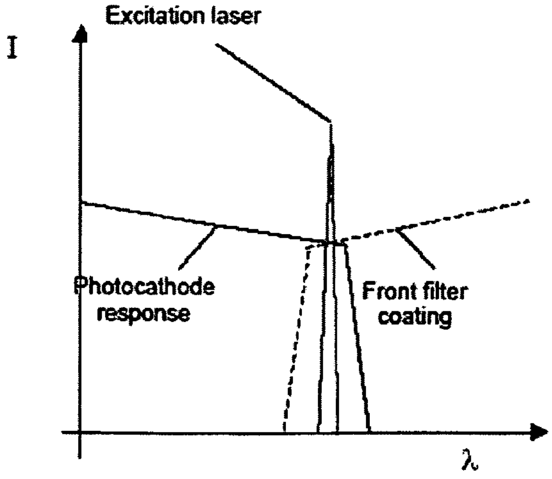
FIG. 13 is a diagram depicting characteristics of the ambient light filter of FIG. 12.

FIG. 12 is a cross-sectional side view showing an emissive screen 110H including a front filter coating 190, which is positioned between emissive screen 110H and the laser system (not shown). For brevity, emissive screen 110H utilizes a photocathode plate 120H and photoanode plate 130H that are constructed and arranged essentially identically to those described above with reference to FIG. 3. Filter coating 190 is formed on glass pane 122H of photocathode plate 120H such that both incoming laser beam 157 and outgoing emitted visible light 137 pass through filter coating 190. In the present embodiment, photocathode layer 125H and filter coating 190 are selected such that they form a narrow bandpass filter around the excitation laser's wavelength (i.e., beam 157), as indicated in FIG. 13. This approach takes advantage of the existence of a photon energy threshold in photocathode layer 125H. The photoelectric effect produced in photocathode layer 125B itself shows a 'lowpass filter' behavior, i.e., no electrons are generated when the photocathode is illuminated with light above a given wavelength. The threshold is sharp and is a function of the photocathode material. The wavelength of the preferred excitation laser would be slightly below the photocathode threshold. When a "high-pass" filter coating 190 with threshold slightly below the laser wavelength is added to the front window, wavelengths shorter than the excitation laser's are prevented from reaching photocathode 125B, and are therefore not amplified. The net effect is that visible light can freely radiate in and out of emissive screen 110H. Ambient visible light will not be amplified, however, because of the photocathode threshold. Ambient UV light with a wavelength shorter than the excitation laser's wavelength would be amplified, but is never allowed to reach the photocathode because of the filter coating. The visible light generated by the luminescent (photoanode) material can still radiate out of the screen unattenuated. This type of narrow band-pass spectral filtering would drastically reduce the ambient photons that get multiplied. This would allow a further reduction in the power of the addressing beam and/or increased gain in the photo-multiplier for use in high-brightness ambients.

A second solution to the potential ambient light problem utilizes a spatial filter, such as a collimation screen, similar to stand-off plate 160 (described above with reference to FIG. 7), that is positioned on the incident side of the emission screen (e.g., in place of filter coating 190 in FIG. 12), with the passages aligned to only allow photons originating from the general direction of the laser scanner to reach the photocathode. This approach is less desirable because it would also compromise viewing angle. Of course, a combination of spatial and photon filtering can be used.

An alternative or complementary approach is to use electrical filtering. The light originating from the laser beam has a characteristic modulation pattern, from the bitmap (source) image data, but particularly from scanning across the fixed grid of UV entry apertures (in the case of the embodiments described above with reference to FIGS. 3 to 7). The laser light that enters an aperture generates electrons that flow through the anode/cathode/power-supply circuit. No electrons are generated or current flows when the laser spot is in between apertures. Hence, the current in the anode/cathode/power-supply circuit shows a characteristic modulation with frequency equal to scan rate divided by aperture spacing. When an electrical bandpass filter centered around this frequency is added to the circuit, only light that shows temporal modulation within the band will be multiplied. (Quasi-) DC ambient light or 50 Hz fluorescent light will not be multiplied; light from the laser will. The modulation frequency from the image data is also within the pass band. This electrical "lock-in" approach would eliminate the need for the optical front filter coating and leave more freedom in laser and photocathode material choice.

A final aspect of the present invention involves maintaining the vacuum gap provided between the photocathode and photoanode plates of the emissive screen. Plasma displays and especially Field Emission Displays (FEDs) use embedded getter materials to help maintain vacuum quality over time. Given the modest gain needed in the emissive screen of the present invention, the inventors assume that the vacuum level requirement of the emissive screen is moderate. That is, unlike FEDs which use emission tips that get very hot and oxidize in the presence of residual oxygen, the emissive screen of the current invention does not use tips that get hot. Further, the small-gap configuration of the FEDs dictate their high current/low energy mode of operation, and the FED phosphors are also known to heat up more, and react more with residual gasses. In contrast, the emissive screens of the present invention, and in particular the "wide gap" embodiments described above with reference to FIGS. 7 and 8, should help reduce the vacuum level required, which would help with packaging cost. Glass frit packaging/sealing and/or other methods known from the FED or plasma display art would also be applicable to current invention.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A display apparatus comprising:

an emissive screen including a plurality of pixels, each pixel including a photocathode region and a luminescent region that is spaced from the photocathode region; and a laser system for directing a laser beam onto selected pixels of the plurality of pixels such that the photocathode of each selected pixel produces free electrons that cause the luminescent region of each selected pixel to emit visible light, thereby producing a desired image on the emissive screen.

2. The display apparatus of claim 1, wherein the photocathode region of each pixel comprises a layer of photocathode material mounted on first surface of a first plate, wherein the luminescent region of each pixel comprises a layer of luminescent material mounted on second surface of a second plate, and wherein the first and second surfaces are separated by a vacuum region.

3. The display apparatus according to claim 1, wherein the laser system includes means for scanning the laser beam in a predetermined pattern across a surface of the emissive screen, and for controlling the laser beam to transmit a relatively high energy pulse to each of the selected pixels.

4. The display apparatus according to claim 1, wherein the emissive screen includes first pixels having red luminescent regions, second pixels having green luminescent regions, and blue pixels having blue luminescent regions, and wherein the laser system includes a first laser for addressing the first, second and third pixels.

5. The display apparatus according to claim 4, wherein the laser beam generated by the first laser has a predetermined wavelength in one of the visible light spectrum, the near-ultraviolet spectrum, and the ultraviolet spectrum.

6. The display apparatus according to claim 4, further comprising a second laser for addressing the first, second and third pixels, wherein the first and second lasers generate laser beams having a single predetermined wavelength.

7. The display apparatus according to claim 1, further comprising:

a photocathode plate including a first glass plate, a first conductive layer formed on an inside surface of the first glass plate, and photocathode material layer formed on the first conductive layer;

a photoanode plate including a second glass plate, a second conductive layer formed on an inside surface of the second glass plate facing the inside surface of the first glass pane, and a plurality of luminescent regions formed on the second conductive layer, wherein the plurality of luminescent regions include a green luminescent region, a blue luminescent region, and a red luminescent region.

8. The display apparatus according to claim 7, wherein the photocathode material layer comprises at least one of an alkali glass, a semiconductor material, carbon nanotubes, carbon powder, and a glass doped with at least one of magnesium, aluminum, potassium, sodium, and carbon.

9. The display apparatus according to claim 7, wherein the plurality of luminescent regions comprise at least one of fluorescing nano-particles and phosphorus.

10. The display apparatus according to claim 7, wherein at least one of the first and second conductive layers comprise a conductive material that is transparent to visible light.

11. The display apparatus according to claim 7, wherein the plurality of luminescent regions define apertures.

12. The display apparatus according to claim 11, wherein each of the plurality of luminescent regions comprises a hexagonal pad of luminescent material defining an associated aperture that is located in a central region of the hexagonal pad.

13. The display apparatus according to claim 11, wherein the second conductive layer includes a plurality of electrically linked annular anode electrodes, each anode electrode being located on a corresponding luminescent regions, wherein an outer diameter of each anode electrode is smaller than the outer diameter of its corresponding luminescent region, and an inner diameter of each anode electrode is larger than a diameter of the aperture defined by the associated luminescent region.

14. The display apparatus according to claim 7, wherein the plurality of luminescent regions are separated by non-luminescent border regions.

15. The display apparatus according to claim 14, wherein the non-luminescent border regions are black.

16. The display apparatus according to claim 14, further comprising a stand-off plate mounted between the photocathode plate and the photoanode plate, wherein the stand-off plate defines a plurality of passages, each passage extending between the photocathode region and the luminescent region of an associated pixel.

17. The display apparatus according to claim 14, further comprising a millichannel plate mounted between the photocathode plate and the photoanode plate, wherein the millichannel plate defines a plurality of channels, wherein each channel extends between the photocathode region and the luminescent region of an associated pixel, and wherein each channel is coated with a material characterized by having a high secondary electron emission yield.

18. The display apparatus according to claim 1, further comprising means for detecting a location at which the laser beam impinges the emissive screen at an associated time, and for controlling the laser system in response to timing/location data associated with the detected location.

19. The display apparatus according to claim 18, wherein said means comprises an elongated position sensitive detector strip extending parallel to an edge of the emissive screen.

20. The display apparatus according to claim 18, wherein said means includes means for modulating the laser beam in response to the timing/location data.

21. The display apparatus according to claim 18, further comprising:

a photocathode plate including a photocathode material layer forming said photocathode region of said plurality of pixels;

a photoanode plate including a photoanode material layer forming said luminescent region of said plurality of pixels, wherein said means for detecting the laser beam location comprises means for determining a differential current generated in at least one of the photocathode material layer and the photoanode material layer.

22. The display apparatus according to claim 21, wherein the laser system includes:

means for scanning the laser beam along parallel scan paths, means for comparing the timing/location data with image source data including a pixel location of a selected pixel, and means for modulating the laser beam from a relatively low power to a relatively high power when the timing/location data indicates that the laser beam is at the pixel location of the selected pixel, thereby causing the selected pixel to emit visible light.

23. The display apparatus according to claim 1, further comprising a filter coating positioned between the emissive screen and the laser system, wherein the laser beam comprises a laser wavelength, wherein the photocathode region comprises a first material and the filter coating comprises a second material, and wherein the first and second materials form an optical bandpass filter that passes the laser wavelength.

24. The display apparatus according to claim 1, further comprising a spatial filter having light passages aligned to pass light received from a direction defined by a straight line between the emissive screen and the laser system.

25. The display apparatus according to claim 1, further comprising an electrical bandpass filter, wherein the laser beam comprises a modulation pattern frequency, and wherein the electrical bandpass filter is centered around the modulation pattern frequency.

26. A display apparatus comprising:

an emissive screen including a first plate including a plurality of photocathode regions, and a second plate including a plurality of luminescent regions, the first and second plates being spaced such that each luminescent region is located adjacent to an associated photocathode region; and a laser system for directing a laser beam over the plurality of photocathodes, and for modulating the laser beam such that relatively high laser pulses are directed onto selected photocathodes of the plurality of photocathodes.

27. A display apparatus comprising:

an emissive screen including an array of pixels, each pixel including a photocathode and a luminescent region arranged adjacent to the photocathode, and means for generating an applied electric field between the photocathode and the luminescent region, and means for directing a beam onto the photocathode of a selected pixel, wherein the beam includes sufficient energy to cause the photocathode to generate free electrons that are accelerated by the applied electric field into the luminescent region of the selected pixel, thereby causing the luminescent region to emit visible light.

* * * * *